Sept. 11, 1962 P. G. CHANCE 3,054,049
ELECTRICAL TESTING APPARATUS
Filed July 17, 1959 3 Sheets-Sheet 1
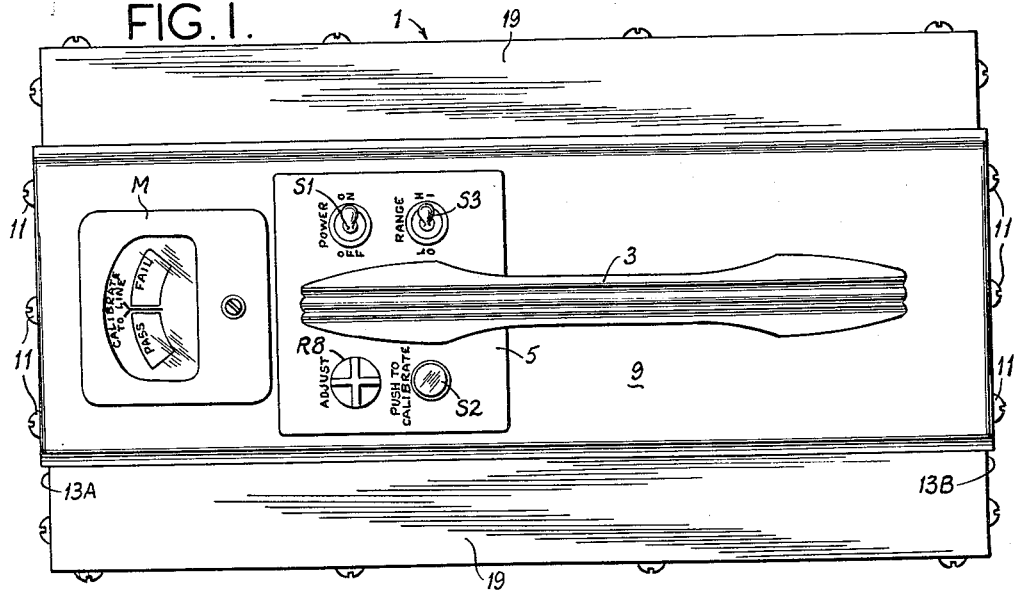
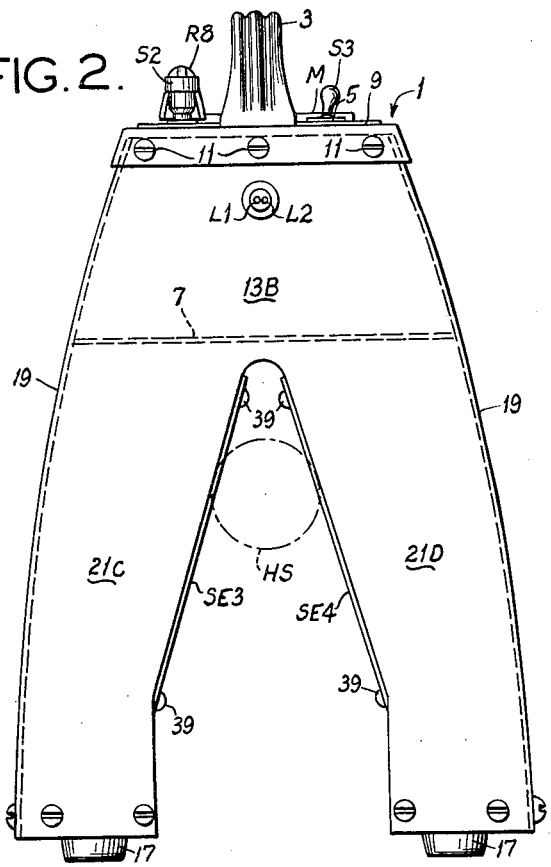
Philip G. Chance,
Inventor.
Koenig and Pope,
Attorneys.

Sept. 11, 1962 P. G. CHANCE 3,054,049
ELECTRICAL TESTING APPARATUS
Filed July 17, 1959 3 Sheets-Sheet 2

Philip G. Chance,
Inventor.
Koenig and Pope,
Attorneys.

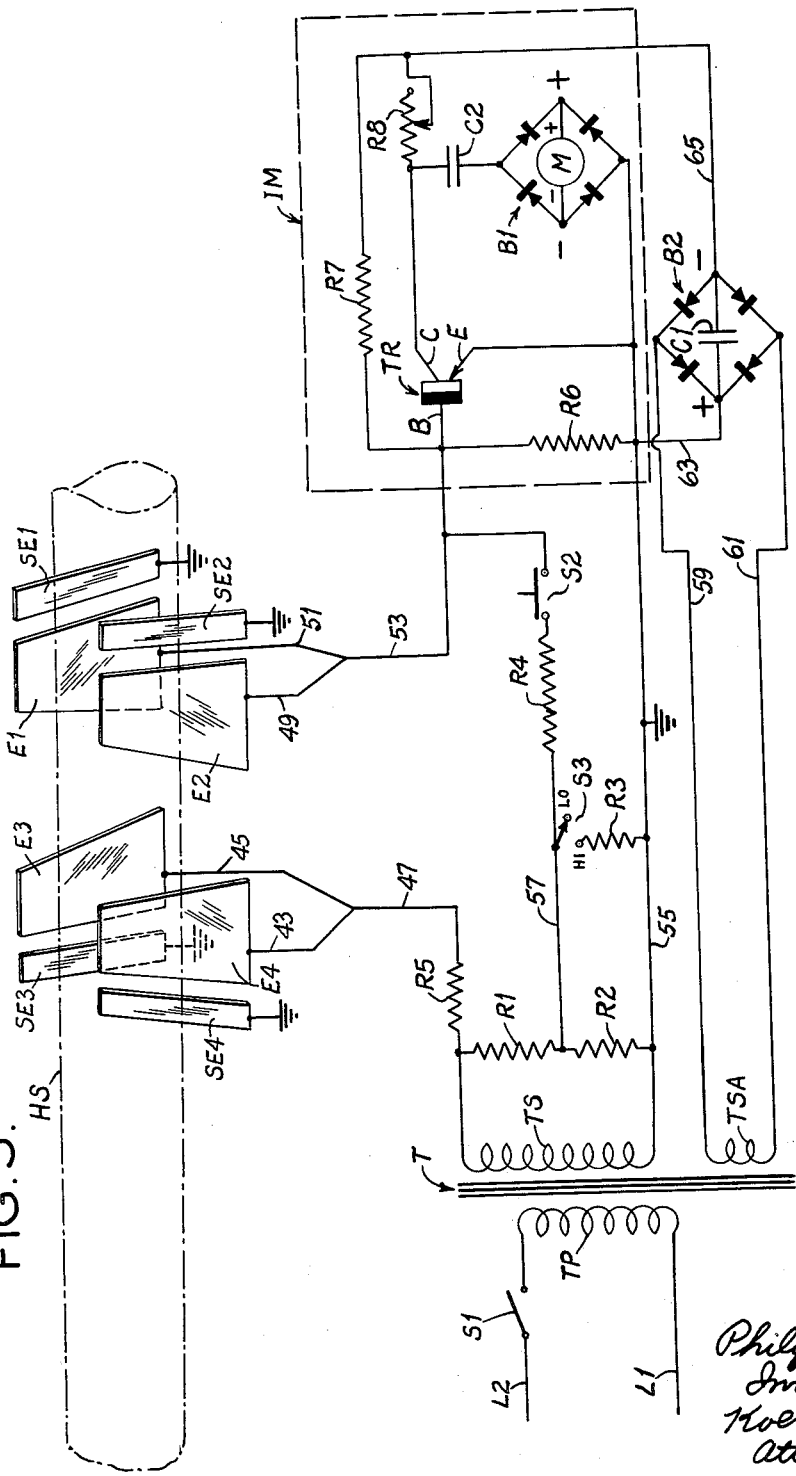

United States Patent Office 3,054,049
Patented Sept. 11, 1962

3,054,049
ELECTRICAL TESTING APPARATUS
Philip G. Chance, Centralia, Mo., assignor to A. B. Chance Company, Centralia, Mo., a corporation of Missouri
Filed July 17, 1959, Ser. No. 827,767
26 Claims. (Cl. 324—54)

This invention relates to electrical testing apparatus, and more particularly to apparatus for testing elongate structures of insulating or dielectric material, such as hot sticks, etc.

Among the several objects of this invention may be noted the provision of hot stick testing apparatus which will reliably indicate the impedance of a hot stick under test to the flow of 60-cycle currents within known limits at extreme values of voltage to which the tool may be subjected during use; the provision of testing apparatus of the class described which will measure the current through the hot stick without being appreciably effected by stray capacitance currents; the provision of a hot stick testing apparatus which will indicate the impedance or true leakage characteristics of all types of insulating or dielectric material, such as wood, fiber, laminated phenolic resin or resin-impregnated fiber-glass materials; the provision of such testing apparatus which will test hot sticks of various lengths and diameters; the provision of apparatus for testing hot sticks which may be calibrated conveniently in the field; the provision of such apparatus which does not in any way damage or impair the usefulness of the hot sticks tested even though they may be in poor condition; the provision of testing apparatus which does not present any safety hazards to testing personnel; the provision of hot stick testing apparatus of the class described which is compact and portable so that it may be readily moved from point to point for testing hot sticks in tool storage depots and even in the field and is rugged so that it may be easily transported by ordinary conveyances without any unusual precautions; and the provision of such testing apparatus which employs no batteries or tubes and is not adversely affected by line voltage variations. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a top plan view of one exemplary embodiment of hot stick testing apparatus of the present invention;

FIG. 2 is an end elevation of the apparatus of FIG. 1;

FIG. 5 is a schematic circuit diagram of a hot stick testing apparatus of the present invention.

Corresponding reference characters indicate corresponding parts throughout the several views of the drawings.

In the servicing of high voltage power lines, it is frequently necessary to perform maintenance while the lines are energized or live. As the electrical potentials between these lines and also relative to ground ranges from 7500 to 345,000 volts, long-handled hot line tools, commonly referred to as hot sticks, are used by the lineman to perform his work and still maintain the necessary insulation and physical spacing between him and the hot or live lines or components on which he is working. It is most important therefore that these hot sticks be in good mechanical condition and have proper insulation values. The elongate handle of the hot stick is usually made of wood although other insulating materials such as resin-impregnated glass fiber are also in use. Inasmuch as these hot sticks are used in the field and are exposed to various weather conditions and usage, it is important that these hot sticks be tested frequently to determine their insulation value. For instance, in the usual wood hot stick, as the moisture content increases the insulation value or impedance decreases so that the level of electrical leakage current from the hot line to the lineman's hands conducted through the hot stick increases until discomfort or severe electric shock may result.

In accordance with the present invention, compact portable apparatus is provided for quickly and reliably testing the impedance of hot sticks so that it may conveniently be determined whether the sticks are safe for use. In essence, my apparatus includes two pairs of opposed metal plates or electrodes arranged end-to-end and spaced apart to form a channel which can be slipped over or straddle a length of the hot stick surfaces so that one pair of opposed electrodes engages opposite sides of one portion of the stick and the other pair of electrodes engages the stick surface at opposite sides of another portion of the stick spaced along the length of the stick from the first portion. These pairs of electrodes are connected in an electrical circuit with an impedance measuring and indicating device and an A.C. potential is applied to this circuit. The impedance, insulation value or leakage current is thereupon indicated, thereby showing whether the hot stick is safe to use.

Figure 3:
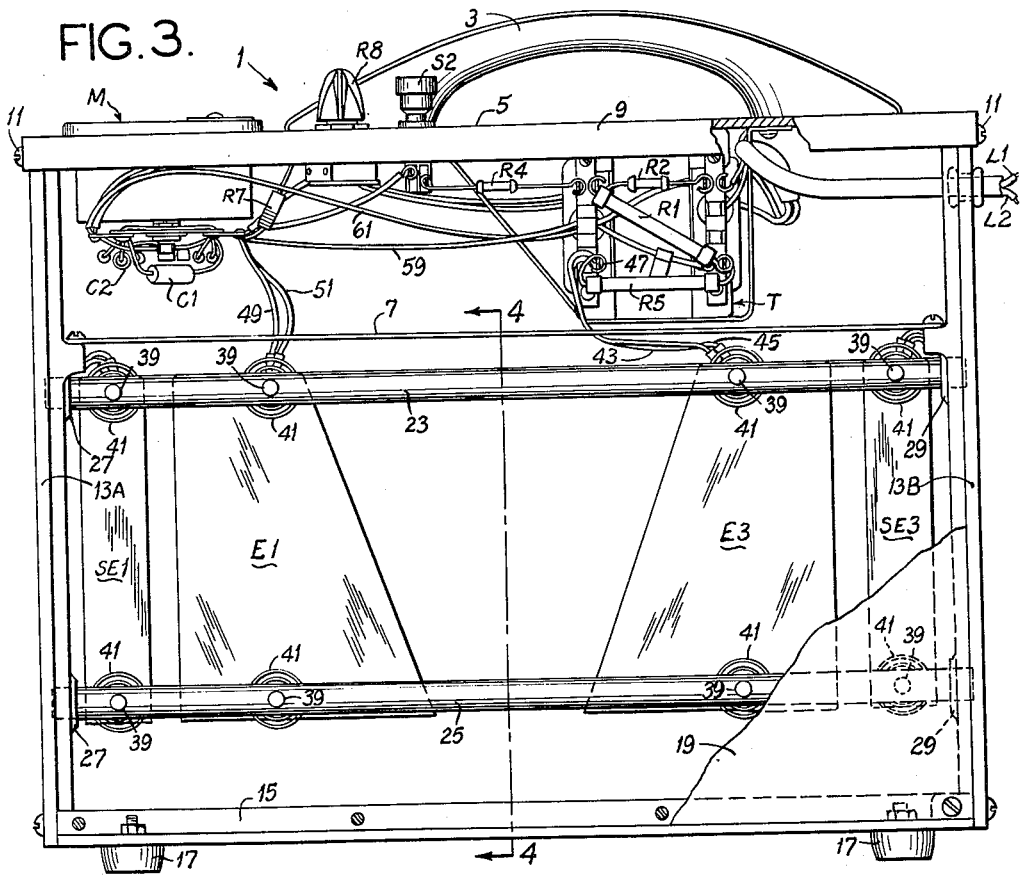
FIG. 3 is a side elevation of the hot stick testing apparatus of FIGS. 1 and 2 with a side panel partially broken away to illustrate the internal physical arrangements of the components.
Figure 4:
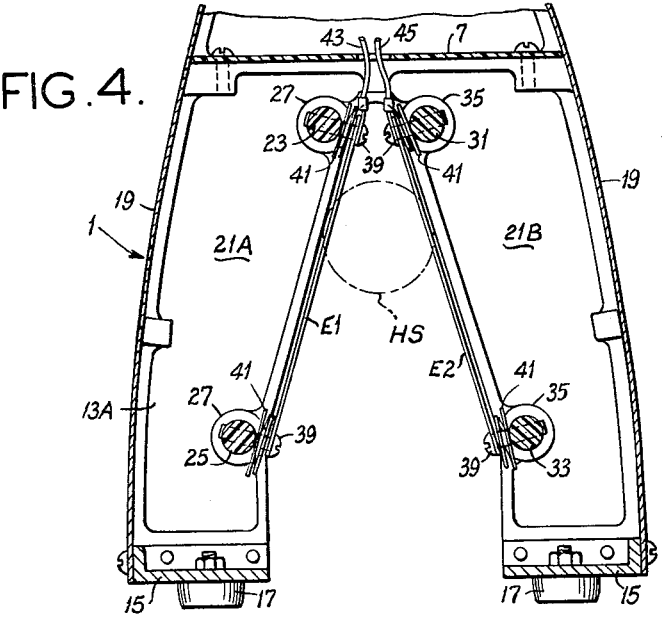
FIG. 4 is a cross section taken on line 4—4 of FIG. 3.

Referring now to the drawings and more particularly to FIGS. 1–4, one embodiment of hot stick testing apparatus of the present invention is generally indicated at reference numeral 1 and comprises a case having a carrying handle 3, a control panel 5 and a meter M mounted on a top panel 9. This panel is secured by machine screws 11 to two identical bifurcated end castings 13A and 13B. Two angle bars 15 span the distance between the lower ends of the legs of the two end castings 13. Rubber mounting feet 17 are bolted to the undersides of these two parallel bars 15 near their respective ends. Two identical metallic side panels 19, affixed to end pieces 13A and 13B, top panel 9 and members 15, enclose and shield the interior components of the hot stick testing apparatus. A partition 7 subdivides the instrument into an upper compartment for installation of the electronic testing components and a lower portion in which are mounted electrode assemblies as described hereinafter.

The lower bifurcated ends of each of the end castings 13A and 13B constitute legs 21A, 21B, 21C and 21D. A first pair of parallel rods or electrode supports 23 and 25 of insulating material is secured at their oposite ends in sockets 27 and 29 formed in end castings 13A and 13B. Two additional similar parallel insulating rods or electrode supports 31 and 33 are mounted in the same fashion in sockets 35 and 37 of these two end plates or castings, 13A and 13B. Two flat trapezoidal metallic electrodes E1 and E3 are resiliently mounted in an end-to-end generally planar relationship on the first pair of parallel elongate electrode supports 23 and 25 by means of screws 39 and conical compression springs 41. Two identical flat trapezoidal metallic electrodes E2 and E4 are similarly mounted on the other pair of parallel elongate supports 31 and 33, so that E2 and E4 fall in a second plane parallel and opposing the first plane including electrodes E1, E3 and thereby define a generally V- shaped channel adapted to accept or receive a length of a hot stick HS. Electrodes E1 and E2 constitute a pair of opposing flat electrodes which engage or straddle opposite side surfaces of one portion of the length of stick HS while electrodes E3 and E4 constitute a second pair of opposing flat electrodes which electrically contact opposite side surfaces of a second portion of the length of stick HS spaced along the length of the stick from the first portion.

The adjacent edges of E1, E3 and those of E2, E4 respectively are spaced apart along this V-shaped channel and because these trapezoidal shaped electrodes are wider at their lower (as viewed in FIGS. 2-4) edges than at the upper edges there is a greater area of contact between the side surfaces of a larger diameter hot stick and electrode pairs E1, E2 and E3, E4 than is the case when a smaller diameter hot stick is tested; the latter being seated deeper in the channel or closer to the apex thereof.

The first electrode assembly E1, E2 also includes a pair of opposing flat rectangular metallic shielding electrodes SE1 and SE2 resiliently mounted by means of screws 39 and compression springs 41 on electrode supports 23, 25 and 31, 33 respectively. SE1 is spaced from the edge of electrode E1 and is generally coplanar therewith. SE2 is similarly positioned relative to E2. The second electrode assembly E3, E4 further includes a similar pair of shielding electrodes SE3 and SE4 coplanar with E3 and E4 and respectively spaced away from the edges thereof. Thus, one side of the V-shaped hot stick receiving channel comprises the four generally coplanar electrodes SE1, E1, E3, SE3 having respective adjacent edges spaced from one another and all resiliently mounted on parallel support rods 23, 25, while the other side of this channel comprises the opposing matching generally coplanar spaced apart electrodes SE2, E2, E4, SE4 similarly resiliently mounted on the other pair of electrode support rods 31, 33.

These first and second pairs of opposing electrodes E1, E2 and E3, E4 are connected in an electrical circuit (as illustrated schematically in FIG. 5) with an A.C. potential source and means for measuring and indicating the impedance of the length of hot stick between electrode pairs E1, E2 and E3, E4. Electrodes E3 and E4 are commonly connected by leads 43, 45 and a wire 47 to one terminal of a resistor R5. The two opposing electrodes E1, E2 comprising the other electrode assembly are similarly commonly connected by leads 49, 51 and a wire 53 to the base element of a transistor TR. Each of the shielding electrode assemblies SE1, SE2 and SE3, SE4 is directly connected to the metal case of the testing apparatus as indicated by the ground symbol.

An A.C. potential is applied to the first and second electrode pairs E1, E2 and E3, E4 via wires 53 and 47 by a circuit including a secondary winding TS of a transformer T, a wire 55, a resistor R6, and the base-emitter circuit of transistor TR. Wire 55 is also grounded to the case so that it and each of shielding electrodes SE1–SE4 and the transistor emitter are at a common zero potential. Primary TP of transformer T is connected by wires L1, L2 and a series power switch S1 to any customary source of A.C. power, e.g., 115 v. A.C. 60 cycle. A voltage divider comprising two series resistors R1 and R2 is shunted across secondary TS. The junction of resistors R1 and R2 is connected by a wire 57, a calibrating resistor R4, and a button switch S2 to wire 53. A series-connected resistor R3 and a switch S3 are shunted across R2.

The impedance measuring and indicating means indicated generally at IM includes transistor TR (PNP type illustrated) connected in a grounded emitter configuration amplifier, the D.C. microammeter M, a bridge rectifier B1, a coupling condenser C2, and bias resistors R6 and R7. Condenser C2 and the input terminals of bridge rectifier B1 are connected in the collector-emitter circuit of the transistor amplifier. Condenser C2 serves also to block the flow of D.C. through the rectifier B1-meter M circuit.

A source of D.C. power for the transistor amplifier is constituted by a bridge rectifier B2 with its input terminals connected by wires 59 and 61 to another secondary TSA of transformer T. The D.C. output of rectifier B2, filtered by condenser C1, is applied by wires 63 and 65 to the transistor amplifier. An adjustable resistor R8, which functions to adjust calibration (by controlling the gain of the transistor amplifier) constitutes the load resistor for the high gain transistor amplifier.

Operation of the hot stick testing apparatus is as follows. Power is supplied to transformer T by closing switch S1 which applies a high voltage A.C. potential (e.g., in the order of 1800 v.) across the R1, R2 voltage divider. The tester is calibrated by temporarily pressing the calibration button switch S2. An A.C. current will thereupon be conducted through the calibrating current resistor R4 to the base-emitter circuit of TR. Meter M is adjusted to a mid-range calibration reading by adjustment of variable resistor R8, which varies the amplified A.C. potential applied to the bridge rectifier B1. The tester is then placed astride or straddling a length of hot stick so that the two electrode assemblies contact opposite side surfaces of spaced-apart portions along the length of hot stick HS. As switch S2 is open, the only path for the flow of A.C. is through wires 47 and 53. The current enters the surface of HS at the areas of contact of electrodes E3, E4 and distributes itself throughout the cross section of the pole or hot stick encompassed therebetween. A similar action occurs at the areas of contact between the side surfaces of the stick contacted by electrodes E1, E2. Thus the current between wires 47 and 53 must flow through the length of hot stick HS between the spaced-apart electrode assemblies E1, E2, and E3, E4. The impedance of this length of hot stick determines the magnitude of current which will flow in the base-emitter input circuit of the transistor amplifier. If the magnitude of this current is greater than that flowing during the preceding calibration test, then the needle of meter M will be deflected to the right of the center calibration line and indicate that the leakage current which flows in the section of HS under test exceeds that which is safe. The hot stick should then be dried and retested. If the microammeter M reads on the left of the central calibration point, then it indicates less leakage current through HS and that the impedance of the stick is sufficiently high so that it may be returned to service and used with assurance of its safeness.

When the hot line tool it to be used on the highest voltage lines it must have even higher impedance and a second instrument range is provided by closing switch S3. Resistor R3 shunts resistor R2 in this condition and lowers the voltage across R2. Upon recalibration (by depressing button switch S2) with S3 closed, a lower calibrating current flows through R4. Thus the instrument is made more sensitive and will reject tools of impedances which would be low enough to cause leakage currents through hot stick HS in excess of safe limits when used in working the highest potential lines.

It will be noted that resistor R5 is in series with wires 47 and 53 and will serve to limit the current between electrode pairs E1, E2 and E3, E4 to a safe value, thus preventing shock hazard to the operator and safeguarding the amplifier, meter and transformer from overloads. It will also be noted that the line voltage supplied to L1, L2 does not need to be held at a precise value, inasmuch as the testing is done by applying a 60 cycle voltage to the hot stick section and comparing the resulting current with that produced by precision resistors during the immediately preceding calibration. Since both these currents are proportional to the test voltage (a function of line voltage) the result is independent of the test and therefore the line voltage. Moreover, as the meter indicates only relative magnitudes of currents, any inaccuracy of the meter and amplifier will not affect the accuracy of the testing.

With a larger diameter hot stick there is a greater cross section area through which the A.C. currents must distribute themselves after entering from the exterior of the stick. This entering causes an error which tends to be greater when testing tools of larger diameters, but this may be compensated either by increasing the area of electrode contact or by decreasing the distance between contacts, or both, for larger poles. Therefore, I prefer to utilize electrodes of trapezoidal shapes, such as illustrated at E1, E2, E3 and E4, and which effect these compensations. Athough the trapezoidal shapes of my preferred embodiment thus provide both means of compensation, other designs utilizing either method only for compensation are clearly within the scope of my invention.

The shielding electrodes SE1–SE4 have an important function in preventing or arresting stray currents due to influences outside the instrument, such as the effect of the operator placing his hands on the pole near the section tested. Without shielding, this would cause grounding or loading of the high voltage circuit and lower the voltage as well as causing stray electrical fields which would adversely affect the accuracy of the reading. The shielding electrodes minimize or prevent any such error-causing stray capacitive currents. It will be understood, however, that shielding electrodes SE1–SE4 need not be separate flat plates as shown or of any paritcular shape, but could be an integral part of end castings or plates 13A and 13B. Also, as indicated above, side panels 19, which are metal or have a metallic layer or coating, provide some electrical shielding for the electrodes E1–E4 and the specimen of hot stick undergoing test.

For purposes of periodically checking the accuracy of the instrument's operation, a calibration standard may be used consisting of a short section of an epoxy resin impregnated fiber glass pole with three spaced-apart metal rings interconnected by two precision resistors. This standard may be inserted in the V-shaped channel of the instrument to connect a fixed known impedance (one of the precision resistors) between pairs of electrodes E1, E2 and E3, E4, as well as interconnecting another known impedance (the other precision resistor) between electrodes E1, E2 and the grounded shielding electrodes SE1, SE2. All calibration resistors are thereby checked.

It is to be understood that the hot stick testing apparatus need not be designed to operate from an external A.C. power source, as illustrated in the exemplary specific apparatus disclosed, but may be fully self-contained and powered by batteries by minor modification of the circuitry such as will be apparent to those skilled in this art. Also, NPN transistors (with the usual polarity reversal precautions) or conventional vacuum tubes are the full equivalents for the purposes of the meter amplifier circuitry of the present invention.

It will also be noted that the apparatus of my invention is not only useful for testing hot sticks, but will also test the impedances of other elongate structures of insulating or dielectric material such as strain insulator rods of resin-impregnated fiber-glass. Thus the term "hot sticks" as used herein includes any such elongate insulating structure.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for testing hot sticks comprising first and second pairs of opposed metallic electrodes connected in an electrical circuit with an A.C. potential source and an impedance measuring and indicating means, said pairs of electrodes being arranged end-to-end and spaced apart to form a channel for accepting a length of hot stick to be tested, one of said first pair and one of said second pair of electrodes being aligned end-to-end on one side of the stick with adjacent edges thereof spaced apart thereby defining one side of the channel, the other electrodes of said first and second pairs being aligned end-to-end on the other side of the stick with adjacent edges thereof spaced apart thereby defining the other side of the channel, said first pair of electrodes adapted to contact a portion of said hot stick on opposite sides thereof, and said second pair of electrodes adapted to contact opposite sides of another portion of the hot stick spaced from said first portion whereby the impedance of the length of hot stick section between said pairs of electrodes is indicated.

2. Apparatus as set forth in claim 1 which further includes means biasing said first pair of opposed electrodes toward each other and means biasing said second pair of electrodes toward each other, whereby good electrical surface contact is assured at the areas of contact between the respective electrodes and the sides of the hot stick.

3. Apparatus as set forth in claim 1 which further includes a plurality of shielding electrodes each adapted to contact a portion of the surface of the hot stick and positioned adjacent but spaced from a respective one of said electrodes whereby stray capacitance currents are minimized between said first and second pairs of electrodes.

4. Apparatus as set forth in claim 1 in which said channel is generally V-shaped in cross section, whereby hot sticks of various diameters may be tested.

5. Apparatus as set forth in claim 4 in which the width of each of the opposed metallic electrodes decreases from the mouth to the apex of said channel whereby the area of contact between the surfaces of the hot stick and each of said electrodes is greater for a larger diameter stick than for a lesser diameter stick.

6. Apparatus as set forth in claim 5 in which each of the electrodes is of generally trapezoidal shape.

7. Apparatus as set forth in claim 1 in which said first pair of opposed electrodes is commonly connected to a first terminal and said second pair of opposed electrodes is commonly connected to a second terminal, said terminals being serially connected with said A.C. potential source across an input circuit of said impedance measuring and indicating means, and said indicating means including a meter for indicating the impedance of the length of hot stick being tested as a function of the current conducted between said terminals when said hot stick is contacted by said pairs of electrodes.

8. Apparatus as set forth in claim 7 in which said measuring and indicating means includes a transistor amplifier, and said electrical circuit further includes a calibrating resistor adapted to be effectively temporarily shunted across said terminals to calibrate said apparatus.

9. Apparatus as set forth in claim 8 in which said input circuit further includes means for alternatively changing the current flow through said calibrating resistor during calibration whereby the sensitivity of said apparatus may be increased.

10. Apparatus for testing hot sticks comprising a channel adapted to accept a length of a hot stick, said channel being defined by a first pair of spaced-apart opposed metallic electrodes adapted to contact a portion of the hot stick on opposite sides thereof and a second pair of spaced-apart opposed metallic electrodes adapted to contact opposite sides of another portion of the hot stick spaced along the length of said hot stick from said first portion, one of said first pair and one of said second pair of electrodes being aligned on one side of the stick with adjacent edges thereof spaced apart thereby defining one side of said channel, the other ones of said first and second pairs of electrodes being aligned on the other side of the stick with adjacent edges of said other electrodes spaced apart thereby defining the other side of the channel, said first and second pairs of electrodes and an A.C. potential source being connected in an electrical circuit together with impedance measuring and indicating means adapted to indicate the impedance of the length of hot stick section between said pairs of electrodes.

11. Apparatus for testing hot sticks comprising a first electrode assembly adapted to engage one portion of the surface of a hot stick and a second electrode assembly adapted to engage another surface portion of said hot stick spaced from said first portion, each of said electrode assemblies comprising a pair of flat spaced-apart opposed metallic electrodes, one of the electrodes in each of the assemblies being positioned in a first plane with adjacent edges thereof spaced apart, the other one of the electrodes in each of the assemblies being positioned in a second plane with adjacent edges thereof spaced apart, said planes being opposed to each other to define a channel adapted to receive a length of a hot stick, said first pair of electrodes being commonly connected to a first terminal and said second pair of electrodes being commonly connected with a second terminal, said terminals and an A.C. potential source being connected in an electrical circuit together with impedance measuring and indicating means whereby the impedance of the length of hot stick section between said pairs of electrodes is indicated.

12. Apparatus as set forth in claim 11 in which said planes are convergent and have a line of intersection at the apex of the channel parallel to the length of the hot stick engaged between the electrode assemblies whereby hot sticks of various diameters may be tested.

13. Apparatus as set forth in claim 12 which further includes means biasing said first pair of opposed electrodes toward each other and means biasing said second pair of electrodes toward each other, whereby good electrical surface contact is assured at the areas of contact between the sides of the hot stick and the respective electrodes.

14. Apparatus as set forth in claim 13 which further includes a plurality of shielding electrodes each positioned adjacent but spaced from a respective one of said electrodes whereby stray capacitance currents are minimized between said first and second electrode assemblies.

15. Apparatus as set forth in claim 14 in which the width of each of the opposed metallic electrodes decreases from the mouth of the apex of said channel whereby the area of contact between the surfaces of the hot stick and each of said electrodes is greater for a larger diameter stick than for a lesser diameter stick.

16. Apparatus for testing hot sticks comprising two pairs of parallel elongate electrode supports of insulating material, said first pair of supports being positioned in a first plane and said second pair of supports being positioned in a second plane, said planes converging toward one another thereby forming a line of intersection, two flat metallic electrodes mounted end-to-end on said first pair of supports with adjacent edges spaced apart, two additional flat metallic electrodes mounted end-to-end on the second pair of supports with adjacent edges spaced apart, the two sets of metallic electrodes being positioned to oppose each other and to define a generally V-shaped channel adapted to accept a length of hot stick to be tested, means biasing each electrode toward its respective opposed electrode whereby good tangential electrical contact is assured between each of the electrodes and a respective portion of the hot stick surface, and an electrical circuit including the pairs of opposing electrodes connected with an A.C. potential source and impedance measuring and indicating means whereby the impedance of the length of the hot stick section between opposing pairs of electrodes is indicated.

17. Apparatus as set forth in claim 16 which further includes a first pair of shielding electrodes resiliently mounted on said first pair of supports, each of said shielding electrodes being positioned adjacent an edge of a respective one of the first said two metallic electrodes, a second pair of shielding electrodes resiliently mounted on said second pair of supports, each of said second shielding electrodes being positioned adjacent an end edge of a respective one of said additional two metallic electrodes and respectively opposing said first pair of shielding electrodes on opposite sides of said channel, said shielding electrodes being commonly connected electrically at a ground potential whereby stray capacitance currents are minimized within the length of the hot stick being tested.

18. Apparatus for testing hot sticks comprising first and second spring biased electrode assemblies each having opposed metallic electrode surfaces, said electrode assemblies being arranged end-to-end and spaced apart to form a channel for accepting a length of hot stick to be tested, said first electrode assembly adapted to contact a portion of said hot stick on opposite sides thereof, and said second electrode assembly adapted to contact opposite sides of another portion of the hot stick spaced from said first portion, said electrode assemblies being connected in an electrical circuit having an A.C. potential source and means for measuring and indicating the axial impedance of a hot stick being tested without causing the dielectric breakdown thereof, whereby the impedance of the length of hot stick section between said electrode assemblies is indicated.

19. Apparatus for testing rod-like dielectrics comprising a channel open the length thereof to receive a length of rod-like dielectric that is placed in said channel by moving said length of rod-like dielectric sideways therein, said channel being defined by a first electrode assembly having spaced-apart opposed metallic electrode surfaces adapted to contact a portion of the rod-like dielectric on opposite sides thereof and a second electrode assembly having spaced-apart opposed metallic electrode surfaces adapted to contact opposite sides of another portion of the rod-like dielectric spaced along the length of said rod-like dielectric from said first portion, said first and second electrode assemblies and an A.C. potential source being connected in an electrical circuit together with impedance measuring and indicating means adapted to indicate the impedance of the length of the rod-like dielectric section between said electrode assemblies.

20. Apparatus for testing hot sticks comprising a channel adapted to accept a length of hot stick, said channel being defined by a first electrode assembly having spaced-apart opposed metallic electrode surfaces adapted to contact a portion of the hot stick on opposite sides thereof and a second electrode assembly having spaced-apart opposed metallic electrode surfaces adapted to contact opposite sides of another portion of the hot stick spaced along the length of said hot stick from said first portion, said first and second electrode assemblies and an A.C. potential source being connected in an electrical circuit together with impedance measuring and indicating means adapted to indicate the impedance of the length of hot stick section between said electrode assemblies, said apparatus further comprising first and second shielding electrode assemblies each adapted to contact a portion of the surface of the hot stick and each positioned adjacent but spaced from a respective one of said electrode assemblies whereby stray capacitance currents are minimized between said first and second electrode assemblies.

21. Apparatus as set forth in claim 20 in which each of said shielding electrode assemblies has opposed metallic surfaces which are respectively aligned in two planes common with the two planes of the opposing surfaces of said other metallic electrodes thereby defining endwise extensions of said channel.

22. Apparatus as set forth in claim 21 in which said channel is generally V-shaped in cross section whereby hot sticks of various diameters may be tested.

23. Apparatus as set forth in claim 22 in which said first electrode assembly is commonly connected to a first terminal and said second electrode assembly is commonly connected to a second terminal, said terminals being serially connected with said A.C. potential source across an input circuit of said impedance measuring and indicating means, said indicating means including a meter for indicating the impedance of the length of the hot stick being tested as a function of the current conducted between said terminals when said hot stick is contacted by said electrode assemblies, said shielding electrode assemblies being commonly connected to a third terminal which is at a zero potential relative to said impedance measuring and indicating means.

24. Apparatus as set forth in claim 23 in which measuring and impedance means includes a transistor amplifier and said electrical circuit further includes a calibrating resistor adapted to be effectively temporarily shunted across said terminals to calibrate said apparatus.

25. A hot stick tester comprising a housing having bifurcated portions that generally define an elongated V-shape, the inner opposed faces of which V-shape comprise two pairs of oppositely opposed flat electrode plates, said pairs being aligned end-to-end and longitudinally spaced so that a length of hot stick may be inserted in said V to contact the opposite plates of each electrode pair along opposite portions of the surface of the hot stick, spring biasing means normally urging the oppositely opposed plates of each said pair toward each other, insulated mounting means for said electrode plates, circuit means connected to said pairs of electrode plates to form a closed electrical circuit when a hot stick is mounted in contact with said pairs, said circuit means comprising power means, impedance measuring means, impedance indicating means, and calibration means for said impedance indicating means, whereby the impedance of a section of hot stick in contact with said electrodes and lying therebetween may be measured and indicated.

26. Apparatus as set forth in claim 25 which further comprises two shielding electrodes, said shielding electrodes being aligned and longitudinally spaced with said two pairs of oppositely opposed electrode plates lying therebetween, said shielding electrodes being adapted to contact the portions of a hot stick being tested that lie outside of the section between said pairs of electrode plates.

References Cited in the file of this patent
UNITED STATES PATENTS

| | | |
|---|---|---|
| 856,012 | Wolcott | June 4, 1907 |
| 1,897,330 | Pender | Feb. 14, 1933 |
| 1,950,484 | Clarvoe | Mar. 13, 1934 |
| 2,626,982 | Collins | Jan. 27, 1953 |
| 2,890,409 | Krevelen | June 9, 1959 |